United States Patent
Ratner et al.

(10) Patent No.: US 11,620,748 B2
(45) Date of Patent: Apr. 4, 2023

(54) SYSTEMS AND METHODS FOR GENERATING A 2D IMAGE FROM A 3D MEDICAL IMAGE

(71) Applicant: International Business Machines Corporation, Armonk, NY (US)

(72) Inventors: Vadim Ratner, Haifa (IL); Yoel Shoshan, Haifa (IL); Tal El-Hay, Modi'in (IL)

(73) Assignee: International Business Machines Corporation, Armonk, NY (US)

(*) Notice: Subject to any disclaimer, the term of this patent is extended or adjusted under 35 U.S.C. 154(b) by 285 days.

(21) Appl. No.: 17/145,440

(22) Filed: Jan. 11, 2021

(65) Prior Publication Data
US 2022/0222811 A1 Jul. 14, 2022

(51) Int. Cl.
G06T 7/00 (2017.01)
G06T 11/00 (2006.01)
G06V 10/764 (2022.01)
G06K 9/62 (2022.01)

(52) U.S. Cl.
CPC .......... *G06T 7/0012* (2013.01); *G06K 9/6267* (2013.01); *G06T 2207/10081* (2013.01); *G06T 2207/10088* (2013.01); *G06T 2207/30068* (2013.01)

(58) Field of Classification Search
CPC ........ G06T 7/0012; G06T 2207/10081; G06T 2207/10088; G06T 2207/30068; G06T 11/00; G06K 9/6267; G06V 2201/03; G06V 10/764
See application file for complete search history.

(56) References Cited

U.S. PATENT DOCUMENTS 10,580,137 B2 3/2020 Amit
2019/0050981 A1* 2/2019 Song .................... G06V 10/255

OTHER PUBLICATIONS

Zhang et al ,2D Convolutional Neural Networks for 3D Digital Breast Tomosynthesis Classification, IEEE International Conference on Bioinformatics and Biomedicine (BIBM), pp. 1013-1017, 2019.

(Continued)

*Primary Examiner* — Siamak Harandi
(74) *Attorney, Agent, or Firm* — G.E. Ehrlich

(57) ABSTRACT

There is provided a method for generating a composite 2D interpretation image, comprising inputting each 2D medical image of a divided 3D image, into a 2D classifier trained on 2D images labelled with an indication of a visual finding, computing a respective explanation map for each respective 2D image, the respective explanation map including regions corresponding to corresponding regions of the respective 2D image, each respective region of the respective explanation map is associated with a computed explainable weight indicative of an influence of the respective corresponding region of the respective 2D image on the outcome of the 2D classifier fed the respective 2D image, and computing a composite 2D interpretation image comprising a respective aggregation weight for each respective region thereof, each respective aggregation weight computed by aggregating the explainable weights computed for the respective regions corresponding to the respective region of the composite 2D interpretation image.

18 Claims, 5 Drawing Sheets

(56) References Cited

OTHER PUBLICATIONS

Singh et al, Explainable Deep Learning Models in Medical Image Analysis, MDPI, J. Imaging 6, 52, pp. 1-19, 2020.
Van Schie et al, Generating Synthetic Mammograms From Reconstructed Tomosynthesis vols. IEEE Transactions On Medical Imaging, vol. 32, No. 12, Dec. 2013, pp. 2322-2331.
Liang et al, ,Joint 2D-3D Breast Cancer Classification, IEEE International Conference on Bioinformatics and Biomedicine (BIBM), pp. 692-696. IEEE, 2019.
Wei et al, Synthesizing Mammogram from Digital Breast Tomosynthesis, Published in final edited form as: Phys Med Biol. ; 64(4): 045011. doi:10.1088/1361 -6560/aafcda.
Linda R. N. et al, The Benefits of Using Synthesized 2D (C-View™) Images in Breast Tomosynthesis Exams, Clinical Casereviews.
Skaane, et al, Two-View Digital Breast Tomosynthesis Screening with Synthetically Reconstructed Projection Images: Comparison with Digital Breast Tomosynthesis with Full-Field Digital Mammographic Images, Radiology: vol. 271: No. 3—Jun. 2014 n radiology.rsna.org, pp. 655-693.

\* cited by examiner

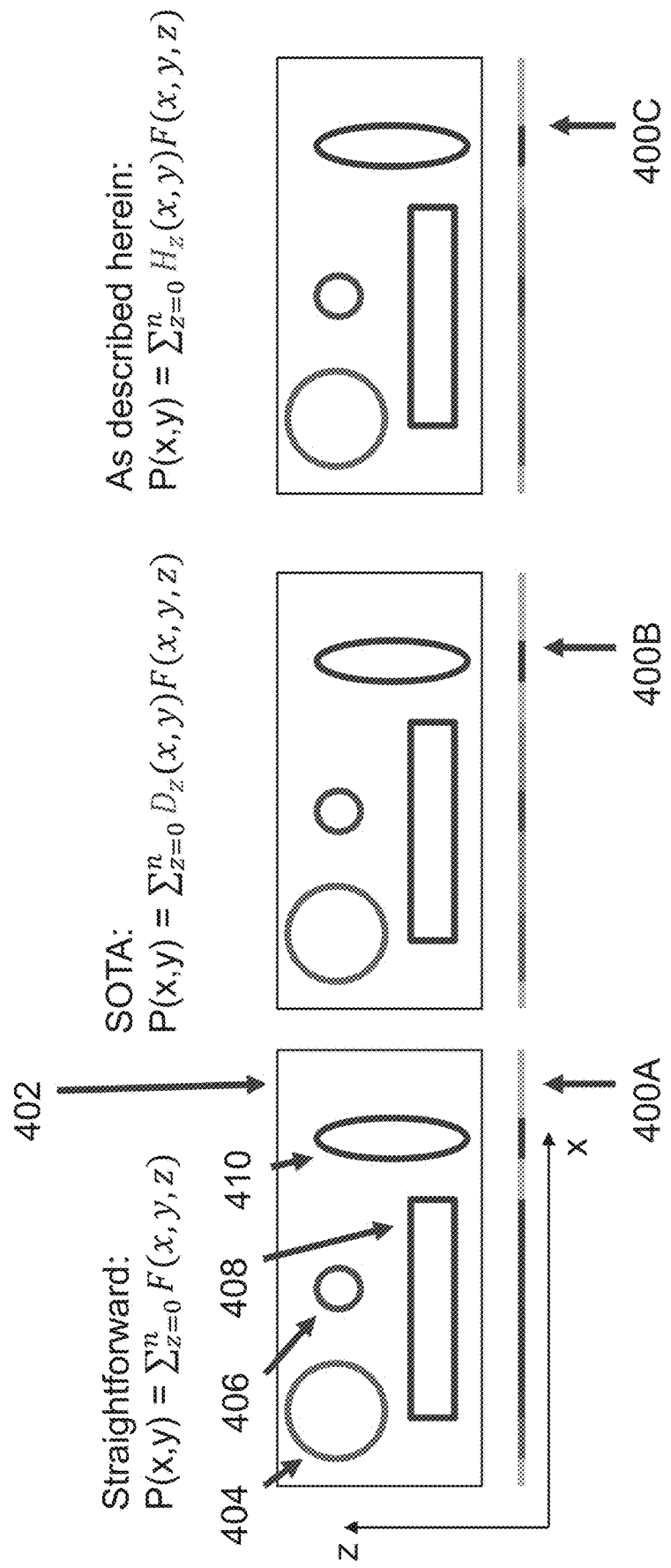

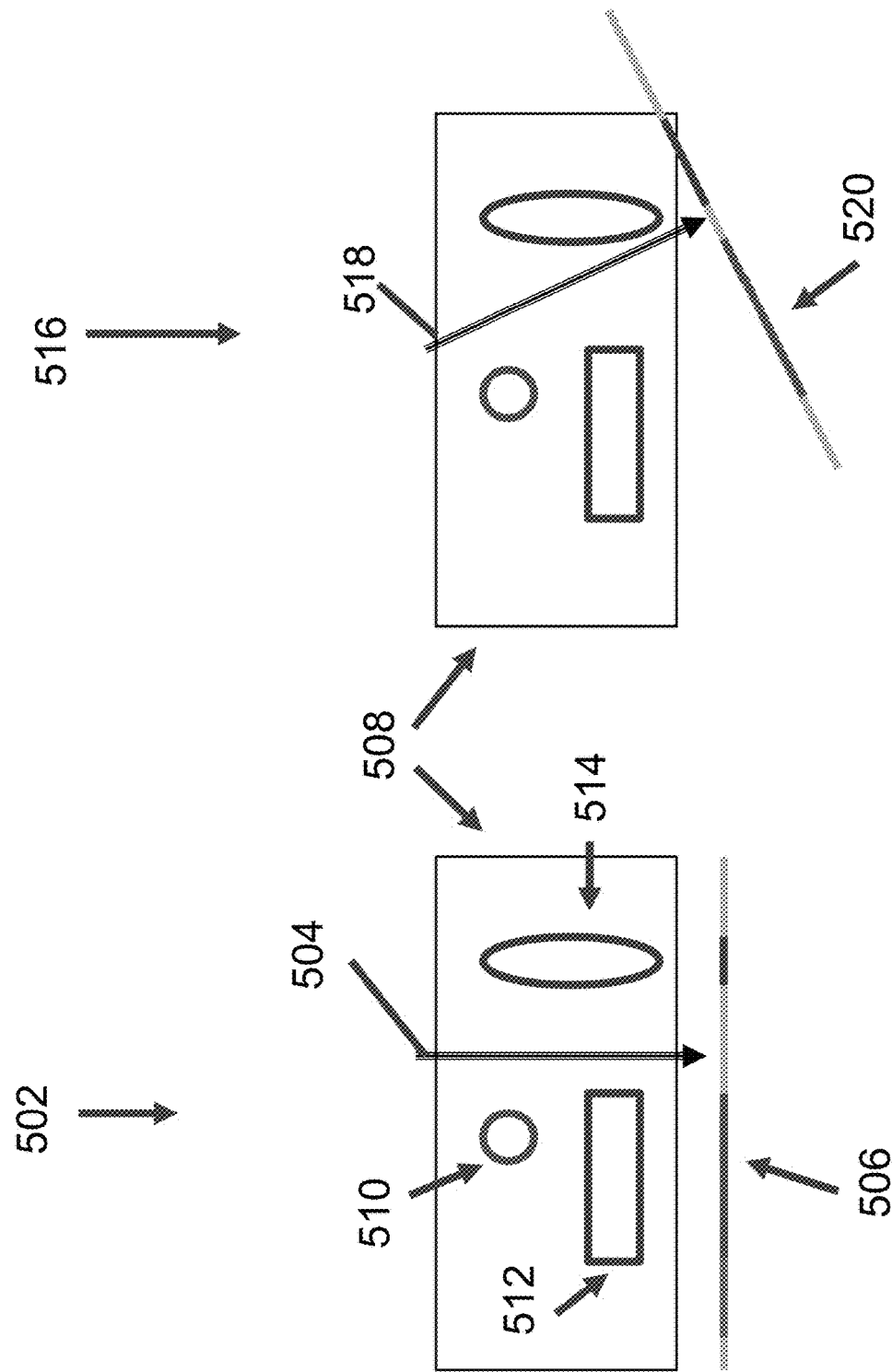

SYSTEMS AND METHODS FOR GENERATING A 2D IMAGE FROM A 3D MEDICAL IMAGE

BACKGROUND

The present invention, in some embodiments thereof, relates to medical image processing and, more specifically, but not exclusively, to a systems and methods for generating 2D medical images from 3D medical images.

2D medical images may be created from 3D medical images for helping a radiologist navigate through the 3D medical image. The radiologist may use the 2D medical image in order to determine which parts of the 3D medical image to focus on. For example, in 2D image of a CT scan showing a lung nodule in a certain lobe of certain lung, the radiologist may view slices of the CT scan corresponding to the certain lobe to get a better view of the lung nodule.

SUMMARY

According to a first aspect, a computer implemented method for generating a composite 2D interpretation image from a 3D medical image, comprises: inputting each of a plurality of 2D medical images created by dividing a 3D medical image, into a 2D classifier trained on a training dataset of 2D medical images labelled with an indication of a visual finding depicted therein, computing a respective explanation map of a plurality of explanation maps for each respective 2D medical image of the plurality of 2D medical images, the respective explanation map including a plurality of regions corresponding to a plurality of corresponding regions of the respective 2D image, each respective region of the respective explanation map is associated with a computed explainable weight indicative of an influence of the respective corresponding region of the respective 2D medical image on the outcome of the 2D classifier fed the respective 2D medical image, computing a composite 2D interpretation image comprising a respective aggregation weight for each respective region thereof, each respective aggregation weight computed by aggregating a plurality of the explainable weights computed for the respective regions of the plurality of explanation maps corresponding to the respective region of the composite 2D interpretation image, and providing the composite 2D interpretation image for presentation on a display.

According to a second aspect, a method of generating a 2D classifier for analysis of 2D images of a 3D medical image, comprises: accessing a plurality of training 3D medical images, for each respective 3D medical image of the plurality of 3D medical images: dividing the respective 3D medical image into a plurality of 2D medical images, inputting each of the plurality of 2D medical images into a 2D classifier trained on a training dataset of 2D medical images labelled with an indication of a visual finding depicted therein, computing a respective explanation map of a plurality of explanation maps for each respective 2D medical image of the plurality of 2D medical images, the respective explanation map including a plurality of regions corresponding to a plurality of corresponding regions of the respective 2D image, each respective region of the respective explanation map is associated with a computed explainable weight indicative of an influence of the respective corresponding region of the respective 2D medical image on the outcome of the 2D classifier fed the respective 2D medical image, computing a composite 2D interpretation image comprising a respective aggregation weight for each respective region thereof, each respective aggregation weight computed by aggregating a plurality of the explainable weights computed for the respective regions of the plurality of explanation maps corresponding to the respective region of the composite 2D interpretation image, assigning a label to the composite 2D interpretation image indicative of presence of the visual finding depicted therein, generating an updated training dataset including a plurality of the composite 2D interpretation images and corresponding labels, and generating an updated 2D classifier by updating the training of the 2D classifier using the updated training dataset.

According to a third aspect, a computer implemented method for generating a composite 2D interpretation image from sequentially acquired video 2D medical images, comprises: receiving a sequence of a plurality of 2D medical images captured as a video over a time interval, wherein the plurality of 2D medical images are temporally spaced apart, inputting each of the plurality of 2D medical images into a 2D classifier trained on a training dataset of 2D medical images labelled with an indication of a visual finding depicted therein, computing a respective explanation map of a plurality of explanation maps for each respective 2D medical image of the plurality of 2D medical images, the respective explanation map including a plurality of regions corresponding to a plurality of corresponding regions of the respective 2D image, each respective region of the respective explanation map is associated with a computed explainable weight indicative of an influence of the respective corresponding region of the respective 2D medical image on the outcome of the 2D classifier fed the respective 2D medical image, and computing a composite 2D interpretation image comprising a respective aggregation weight for each respective region thereof, each respective aggregation weight computed by aggregating a plurality of the explainable weights computed for the respective regions of the plurality of explanation maps corresponding to the respective region of the composite 2D interpretation image.

According to a fourth aspect, a computer implemented method of generating a composite 2D interpretation image from a 3D medical image, comprises: inputting each of a plurality of 2D medical images obtained by at least one of: dividing a 3D medical image and captured as a video over a time interval, into a 2D classifier trained on a training dataset of 2D medical images labelled with an indication of a visual finding depicted therein, computing a respective explanation map of a plurality of explanation maps for each respective 2D medical image of the plurality of 2D medical images, the respective explanation map including a plurality of regions corresponding to a plurality of corresponding regions of the respective 2D image, each respective region of the respective explanation map is associated with a computed explainable weight indicative of an influence of the respective corresponding region of the respective 2D medical image on the outcome of the 2D classifier fed the respective 2D medical image, computing a composite 2D interpretation image comprising a respective aggregation weight for each respective region thereof, each respective aggregation weight computed by aggregating a plurality of the explainable weights computed for the respective regions of the plurality of explanation maps corresponding to the respective region of the composite 2D interpretation image, and providing the composite 2D interpretation image for presentation on a display.

According to a fifth aspect, a device for generating a composite 2D interpretation image from a 3D medical image, comprises: at least one hardware processor executing a code for: inputting each of a plurality of 2D medical images obtained by at least one of: dividing a 3D medical image and captured as a video over a time interval, into a 2D classifier trained on a training dataset of 2D medical images labelled with an indication of a visual finding depicted therein, computing a respective explanation map of a plurality of explanation maps for each respective 2D medical image of the plurality of 2D medical images, the respective explanation map including a plurality of regions corresponding to a plurality of corresponding regions of the respective 2D image, each respective region of the respective explanation map is associated with a computed explainable weight indicative of an influence of the respective corresponding region of the respective 2D medical image on the outcome of the 2D classifier fed the respective 2D medical image, computing a composite 2D interpretation image comprising a respective aggregation weight for each respective region thereof, each respective aggregation weight computed by aggregating a plurality of the explainable weights computed for the respective regions of the plurality of explanation maps corresponding to the respective region of the composite 2D interpretation image, and providing the composite 2D interpretation image for presentation on a display.

According to a sixth aspect, a computer program product for generating a composite 2D interpretation image from a 3D medical image, comprises a non-transitory medium storing a computer program which, when executed by at least one hardware processor, cause the at least one hardware processor to perform: inputting each of a plurality of 2D medical images obtained by at least one of: dividing a 3D medical image and captured as a video over a time interval, into a 2D classifier trained on a training dataset of 2D medical images labelled with an indication of a visual finding depicted therein, computing a respective explanation map of a plurality of explanation maps for each respective 2D medical image of the plurality of 2D medical images, the respective explanation map including a plurality of regions corresponding to a plurality of corresponding regions of the respective 2D image, each respective region of the respective explanation map is associated with a computed explainable weight indicative of an influence of the respective corresponding region of the respective 2D medical image on the outcome of the 2D classifier fed the respective 2D medical image, computing a composite 2D interpretation image comprising a respective aggregation weight for each respective region thereof, each respective aggregation weight computed by aggregating a plurality of the explainable weights computed for the respective regions of the plurality of explanation maps corresponding to the respective region of the composite 2D interpretation image, and providing the composite 2D interpretation image for presentation on a display.

In a further implementation form of the first, second, third, fourth, fifth, and sixth aspects, each respective aggregation weight denoting respective likelihood of presence of the visual finding at the corresponding respective region of the computed composite 2D interpretation image.

In a further implementation form of the first, second, fourth, fifth, and sixth aspects, the plurality of 2D medical images are computed by dividing the 3D medical image along a z-axis into a plurality of sequential 2D slices, wherein the respective aggregation weight is computed for each respective region of the plurality of sequential 2D slices having common x,y coordinates along an x-axis and a y-axis and varying z coordinates along the z-axis.

In a further implementation form of the first, second, fourth, fifth, and sixth aspects, the orientation of the z-axis defining an axis of slicing of the 3D medical image into the plurality of sequential 2D slices is obtained according to a viewing axis selected by a user viewing the 3D medical image presented on a display, wherein the composite 2D interpretation image computed based on the z-axis corresponding to the viewing axis is presented on the display, alongside the 3D medical image, and further comprising, in at least one iteration: dynamically detecting a change in the viewing axis of the 3D medical image presented on the display, dynamically computed an updated composite 2D interpretation image based on the change in the viewing axis, and dynamically updating the display for presenting the updated composite 2D interpretation image.

In a further implementation form of the first, second, fourth, fifth, and sixth aspects, further comprising: computing a certain orientation of the z-axis defining an axis of slicing of the 3D medical image into the plurality of sequential 2D slices that generates an optimal composite 2D interpretation image with maximal aggregation weights denoting minimal occlusion of the visual finding, automatically adjusting the presentation of the 3D medical image on the display to the certain orientation of the z-axis, and presenting the optimal composite 2D interpretation image on the display.

In a further implementation form of the first, second, fourth, fifth, and sixth aspects, each of the plurality of 2D medical images includes pixels corresponding to voxels of the 3D medical image, a respective explainable weight is assigned to each pixel of each of the plurality of 2D medical images, and the respective aggregation weight is computed for each pixel of the composite 2D interpretation image having a certain (x,y) coordinate by aggregating the explainable weights of pixels of the plurality of 2D medical images having corresponding (x,y) coordinates for varying z coordinates.

In a further implementation form of the first, second, third, fourth, fifth, and sixth aspects, the indication of the visual finding of the training dataset is non-localized, for the respective 2D image as a whole, and wherein the 2D classifier generates an outcome indicative of the visual finding for an input 2D image as a whole, with non-localization data.

In a further implementation form of the first, second, third, fourth, fifth, and sixth aspects, each explanation weight of each respective explanation map denotes a relative influence of the respective corresponding region on the outcome of the 2D classifier.

In a further implementation form of the first, second, third, fourth, fifth, and sixth aspects, each respective aggregation weight of the composite 2D interpretation image is computed as a weighted mean of the explainable weights computed for the respective regions of the plurality of explanation maps corresponding to the respective region of the composite 2D interpretation image.

In a further implementation form of the first, second, third, fourth, fifth, and sixth aspects, each respective explanation map comprises a plurality of pixels having pixel intensity values corresponding to pixels of the respective 2D medical image adjusted by the corresponding respective explainable weight, wherein the composite 2D interpretation image comprises a plurality of pixels having pixel intensity values computed by aggregating the pixel intensity values adjusted by the corresponding respective explainable weight of the plurality of explanation maps.

In a further implementation form of the first, second, fourth, fifth, and sixth aspects, the 3D medical image is selected from the group consisting of: CT, MRI, breast tomography, digital breast tomosynthesis (DBT), 3D ultrasound, 3D nuclear imaging, and PET.

In a further implementation form of the first, second, third, fourth, fifth, and sixth aspects, the visual finding denotes cancer.

In a further implementation form of the first, second, third, fourth, fifth, and sixth aspects, further comprising selecting a subset of the plurality of explanation maps, wherein each selected explanation map includes at least one cluster of at least one region with explanation weights that is higher by a requirement than explanation weights of other regions excluded from the cluster, wherein the composite 2D image is computed from the selected subset.

In a further implementation form of the fourth, fifth, and sixth aspects, further comprising generating an updated 2D classifier of the 2D classifier for analysis of 2D images of the 3D medical image, by: accessing a plurality of training 3D medical images, for each respective 3D medical image of the plurality of 3D medical images: dividing the respective 3D medical image into a plurality of 2D medical images, inputting each of the plurality of 2D medical images into a 2D classifier trained on a training dataset of 2D medical images labelled with an indication of a visual finding depicted therein, computing a respective explanation map of a plurality of explanation maps for each respective 2D medical image of the plurality of 2D medical images, the respective explanation map including a plurality of regions corresponding to a plurality of corresponding regions of the respective 2D image, each respective region of the respective explanation map is associated with a computed explainable weight indicative of an influence of the respective corresponding region of the respective 2D medical image on the outcome of the 2D classifier fed the respective 2D medical image, computing a composite 2D interpretation image comprising a respective aggregation weight for each respective region thereof, each respective aggregation weight computed by aggregating a plurality of the explainable weights computed for the respective regions of the plurality of explanation maps corresponding to the respective region of the composite 2D interpretation image, assigning a label to the composite 2D interpretation image indicative of presence of the visual finding depicted therein, generating an updated training dataset including a plurality of the composite 2D interpretation images and corresponding labels, and generating the updated 2D classifier by updating the training of the 2D classifier using the updated training dataset.

In a further implementation form of the second, third, fourth, fifth, and sixth aspects, further comprising, after accessing the plurality of training 3D medical images: dividing each of the plurality of 3D medical images into a plurality of 2D medical images, labelling each respective 2D medical image with a label indicative of presence of a visual finding depicted with the respective 2D medical image, wherein the label is non-localized and assigned to the respective 2D medical image as a whole, creating the training dataset of 2D medical images that include the plurality of 2D medical images and associated label that is non-localized, and training the 2D classifier using the training dataset.

In a further implementation form of the third, fourth, fifth, and sixth aspects, the sequence of the plurality of 2D medical images are captured by an imaging device selected from the group consisting of: colonoscope, endoscope, bronchoscope, and 2D ultrasound.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 4, is a schematic depicting respective composite 2D interpretation images, in comparison to other standard approaches for computing a 2D image from a 3D image, in accordance with some embodiments of the present invention; and FIG. 5, which is schematic depicting automated computation of a certain orientation of a z-axis defining an axis of slicing of the 3D medical image into the 2D slices for generating an optimal composite 2D interpretation image with maximal aggregation weights denoting maximal likelihood of presence of the visual finding, in accordance with some embodiments of the present invention.

DETAILED DESCRIPTION

Figure 1:
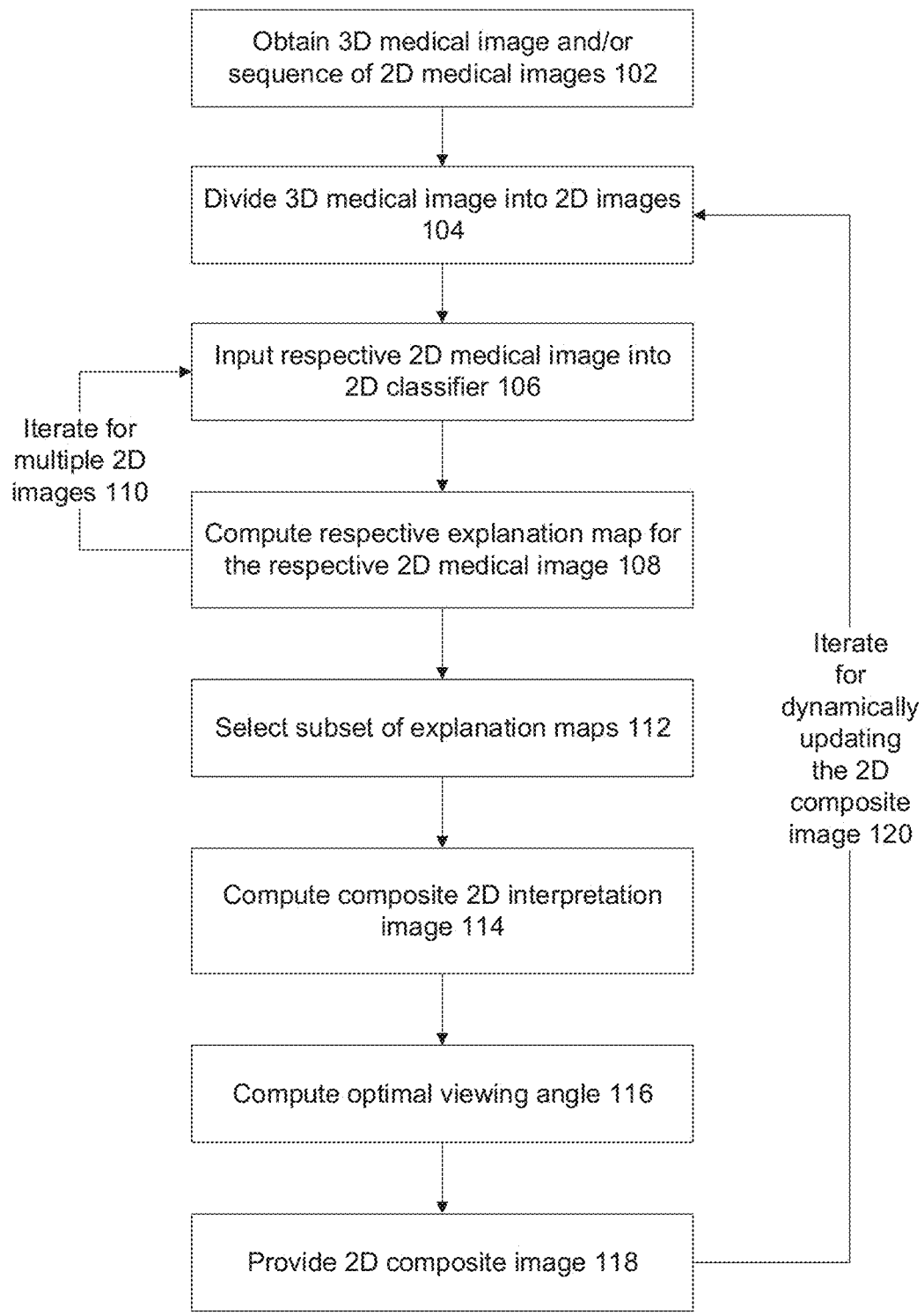
FIG. 1, which is a flowchart of a method of generating a composite 2D interpretation image from a 3D medical image, in accordance with some embodiments of the present invention.

The present invention, in some embodiments thereof, relates to medical image processing and, more specifically, but not exclusively, to a systems and methods for generating 2D medical images from 3D medical images.

An aspect of some embodiments of the present invention relates to a system, a method, an apparatus, and/or code instructions (e.g., stored on a memory, executable by one or more hardware processors) for generating a composite 2D interpretation image from a 3D medical image that includes an indication of the most clinically and/or diagnostically significant regions aggregated from multiple 2D medical images created by dividing a 3D medical image. The 2D medical images created by dividing the 3D medical image, are fed into a 2D classifier. The 2D classifier is trained on a training dataset of 2D medical images labelled with an indication of a visual finding depicted therein, optionally for the 2D image as a whole, i.e. non-localized data. The 2D classifier may generate a non-localized indication of the presence of a visual finding within an inputted 2D image as a whole, without necessarily providing an indication of the location of the visual finding within the 2D image, for example, the 2D classifier is a binary classifier that outputs YES/NO for the presence of the visual finding, and/or a probability of the presence of the visual finding within the 2D image as a whole, and does not necessarily generate a region specific (e.g., per pixel) output indicating which pixel(s) correspond to the visual finding. A respective explanation map is computed for a corresponding respective 2D medical image fed into the 2D classifier. The respective explanation map including regions (e.g., single pixel, group of pixels) corresponding to regions of the respective 2D image (e.g., pixel to pixel correspondence, a group of pixels corresponding to a single pixel). Each respective region of the respective explanation map is associated with a computed explainable weight indicative of an influence of the respective corresponding region of the respective 2D medical image on the outcome of the 2D classifier fed the respective 2D medical image. For example, pixels with relatively higher weights indicate that those pixels played a more significant role in the 2D classifier determining an outcome of a visual finding present in the 2D medical image. The pixels with higher weights indicate that the region depicted by the higher weight pixels may be clinically and/or diagnostically significant. The explainable weights may be computed, for example, using artificial intelligence explainability (XAI) process. A composite 2D interpretation image is computed by projecting the 3D volume onto the composite 2D interpretation image using the weights. A respective aggregation weight is for each corresponding respective region of the multiple explanation maps. Each respective aggregation weight is computed by aggregating the explainable weights computed for the respective regions of the explanation maps corresponding to the respective region of the composite 2D interpretation image, for example, when the 2D images are along the x-y plane, the aggregation weight is computed along the z-axis of the multiple explanation maps for each region in the x-y plane. The composite 2D interpretation image may be provided for presentation on a display, for example, alongside a presentation of the 3D image. The 2D interpretation image may assist the viewer (e.g., radiologist) in deciding on which regions of the 3D image to focus, for example, according to the regions of the 3D image corresponding to the regions of the composite 2D interpretation image with highest aggregation weights.

At least some implementations of the systems, methods, apparatus, and/or code instructions described herein relate to the technical problem of reducing computational resources of processing 3D medical images, for example, captured by CT, MRI, PET, and a 3D mammogram. At least some implementations of the systems, methods, apparatus, and/or code instructions described herein improve a computer processing 3D medical images by reducing the computations resources required to process the 3D medical images in a reasonable time, and/or by reducing the time to process the 3D medical images using existing resources. Processing 3D medical images requires a significant amount of processing resources and/or memory resources, due to the large amount of data stored in 3D medical images. Processing such 3D medical images requires a significant amount of time, making processing of a large number of 3D images impractical. For example, neural networks that apply 3D convolutions take a significant amount of time and/or uses a significant amount of computational resources to process 3D images. Computing a location of identified visual findings in the 3D images consumes an especially large amount of computational resources and/or large amount of processing time. Some existing approaches divide the 3D image into multiple 2D slices, and feed each slice into a 2D classifier designed to identify the location of a visual finding within the respective 2D slice. However, such approach also consumes a large amount of computational resources and/or large amount of processing time to compute the location of each visual finding in each 2D image. Moreover, generating a training dataset of 2D and/or 3D images labelled with a location of visual findings depicted therein for training a 2D and/or 3D classifier requires intensive resources since in such cases the labels are manually added by a trained user that manually view each 2D and/or 3D image in order to locate the visual findings and add the labels. Due to the large amount of work involved to create such training dataset, they are scarce and with small number of images. Classifiers trained using such small training datasets may have low accuracy.

At least some implementations of the systems, methods, apparatus, and/or code instructions described herein provide a solution to the above mentioned technical problem and/or improve the computer processing 3D images, by dividing the 3D medical image into slices of 2D images. Each of the 2D slices is fed into a 2D classifier that is trained to output an indication of whether the visual finding is located within the 2D image as a whole, without determining the location of the visual finding within the 2D image. The 2D classifier may be trained on a training dataset of 2D images labelled with a non-localized label for the image as a whole. Such labelling may be performed automatically, for example, based on natural language processing approaches that analyze a radiology report to determine visual findings depicted in the image, and generate the non-localized label accordingly. Using localized labels enables an automated approach and/or an approach that consumes fewer manual and/or computational resources in comparison to using location labels. The 2D classifier outputting a non-localized outcome consumes significantly fewer computational resources and/or processing time in comparison to a 3D classifier and/or to a 2D classifier that outputs a location for the visual finding. An indication of the location of visual findings within the 3D image is computed by the composite 2D interpretation image computed by aggregating the explanation maps with weights, as described herein, which consumes significantly fewer computational resources and/or processing time in comparison to the 3D classifier and/or to the 2D classifier that outputs a location for the visual finding.

At least some implementations of the systems, methods, apparatus, and/or code instructions described herein may be used with existing trained 2D classifiers, without necessarily requiring re-training of the 2D classifiers. For example, the 2D composite image may be used with an existing 2D classifier that automatically analyses 2D slices of a 3D CT image to detect lung nodules, without necessarily requiring significant adaptation of the 2D classifier.

At least some implementations of the systems, methods, apparatus, and/or code instructions describe herein may use automated tools for creating the training dataset to train the 2D classifier, for example, automated tools that analyze a radiology report and generate a label indicating which visual findings the radiologist found in the image without necessarily indicating here the visual finding is located in the image.

At least some implementations of the systems, methods, apparatus, and/or code instructions described herein relate to the technical problem of improving visibility of visual features captured in 3D imaging data, for example, captured by CT, MRI, PET, and a 3D mammogram. At least some implementations of the systems, methods, apparatus, and/or code instructions described herein relate to the technical problem of improving visibility of visual features captured as a video of 2D imaging data, for example, captured by a colonoscope, endoscope, bronchoscope, and/or 2D ultrasound.

At least some implementations of the methods, systems, apparatus, and/or code instructions described herein address the technical problem and/or improve the technical field, of generating a 2D reference image for a 3D image and/or a 2D video. The 2D reference image may be used by the user in order to help navigate the 3D image and/or the 2D video. For example, the 2D reference image is viewed by the user in order to help determine which anatomical regions seem suspicious for including visual findings (e.g., cancer), in order to spend more time viewing the corresponding anatomical regions in the 3D image and/or the frames of the 2D video.

At least some implementations of the methods, systems, apparatus, and/or code instructions described herein address the technical problem and/or improve the technical field, of generating a 2D reference image for a 3D image and/or a sequence of 2D images by feeding the 2D slices of the 3D images and/or feeding the frames of the 2D video into a 2D classifier that generates a non-localized outcome. The 2D classifier is trained on a training dataset of 2D images with non-localized labels, i.e., the label is for the 2D images as a whole without an indication of the location of the visual finding in the 2D image. An explanation map is computed for each of the fed 2D slices and/or frames. The explanation map includes weights indicative of influence of respective regions of the fed 2D slice and/or frame of the outcome of the 2D classifier. A 2D composite image is created by aggregating the weights of the explanation maps. Pixels denoting the visual finding in the 2D composite image are depicted with higher relative weights to other pixels of the 2D composite image that do not depict the visual finding, for example, appear brighter.

The approaches of at least some implementations of the methods, systems, apparatus, and/or code instructions described herein are different than other standard approaches for creating a 2D reference image from a 3D image. For example, in some approaches, the 3D image is projected to a 2D plane to create the 2D reference image, which does not provide any context awareness, for example, a standard CVIEW. In such images, important visual findings may be obscured by other non-significant anatomical features and/or artifacts. In another example, the 3D image is projected to a 2D plane to create the 2D reference image using context awareness, for example, using maximum intensity projection (MIP). The MIP is performed based on localization information provided by a 2D classifier. In yet another approach, the 3D image is divided into 2D slices, where each slice is inputted into a 2D classifier that generates an outcome indicative of location of the visual finding in the respective image. Such 2D classifiers are trained on a training dataset of 2D images labelled with locations of the visual images depicted therein. Generating such 2D classifiers that output location of the visual finding is difficult and/or resource intensive, since training datasets with localized data are difficult to create since they require manual labelling, and therefore may not be available, or a limited number of images may be available. In contrast, at least some implementations of the methods, systems, apparatus, and/or code instructions described herein using a 2D classifier that generates a non-localized indication of the visual finding. The 2D classifier may be trained on a training dataset with non-localized labels, which may be automatically created from radiology reports using NLP approaches to automatically extract the labels. The location data of the generated composite 2D interpretation image is obtained by aggregating the weights of the explanation maps computed for each 2D slices of the 3D image and/or for the frames of the 2D video.

At least some implementations of the methods, systems, apparatus, and/or code instructions described herein address the technical problem and/or improve the technical field, of increasing accuracy of a 2D classifier that generates a non-localized indication of a visual finding in a 2D image (e.g., slice of a 3D image and/or frames of a 2D video). The accuracy of the classifier is improved by computing a respective composite 2D interpretation image (as described herein) for the 3D images and/or 2D videos of a training dataset, and training the 2D classifier on the composite 2D interpretation image(s), in addition to, or alternatively to, training on the 2D slices of the 3D image and/or frames of the video.

At least some implementations of the methods, systems, apparatus, and/or code instructions described herein address the technical problem and/or improve the technical field, of improving the ability to identify significant visual findings in a 3D image. Viewing the 3D image at a non-optimal orientation may obstruct important visual findings. For example, a small tumor located in the liver may be obscured by other anatomical features and/or by artifacts at certain viewing orientations. At least some implementations of the methods, systems, apparatus, and/or code instructions described herein provide a technical solution to the technical problem, and/or improve the technical field, by computing an optimal viewing orientation of the 3D medical image for minimizing obstruction of the visual finding by other anatomical features and/or artifacts. The optimal viewing orientation is computed as the corresponding axis along which 3D medical images are slices in order to generate a respective composite 2D interpretation image for which the aggregated weights of the explanation maps are maximized, for example, in a cluster. The maximization of the aggregated weights (e.g., in a cluster) denotes a best view of the visual finding. The 3D image may be presented at the optimal viewing orientation to the user.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
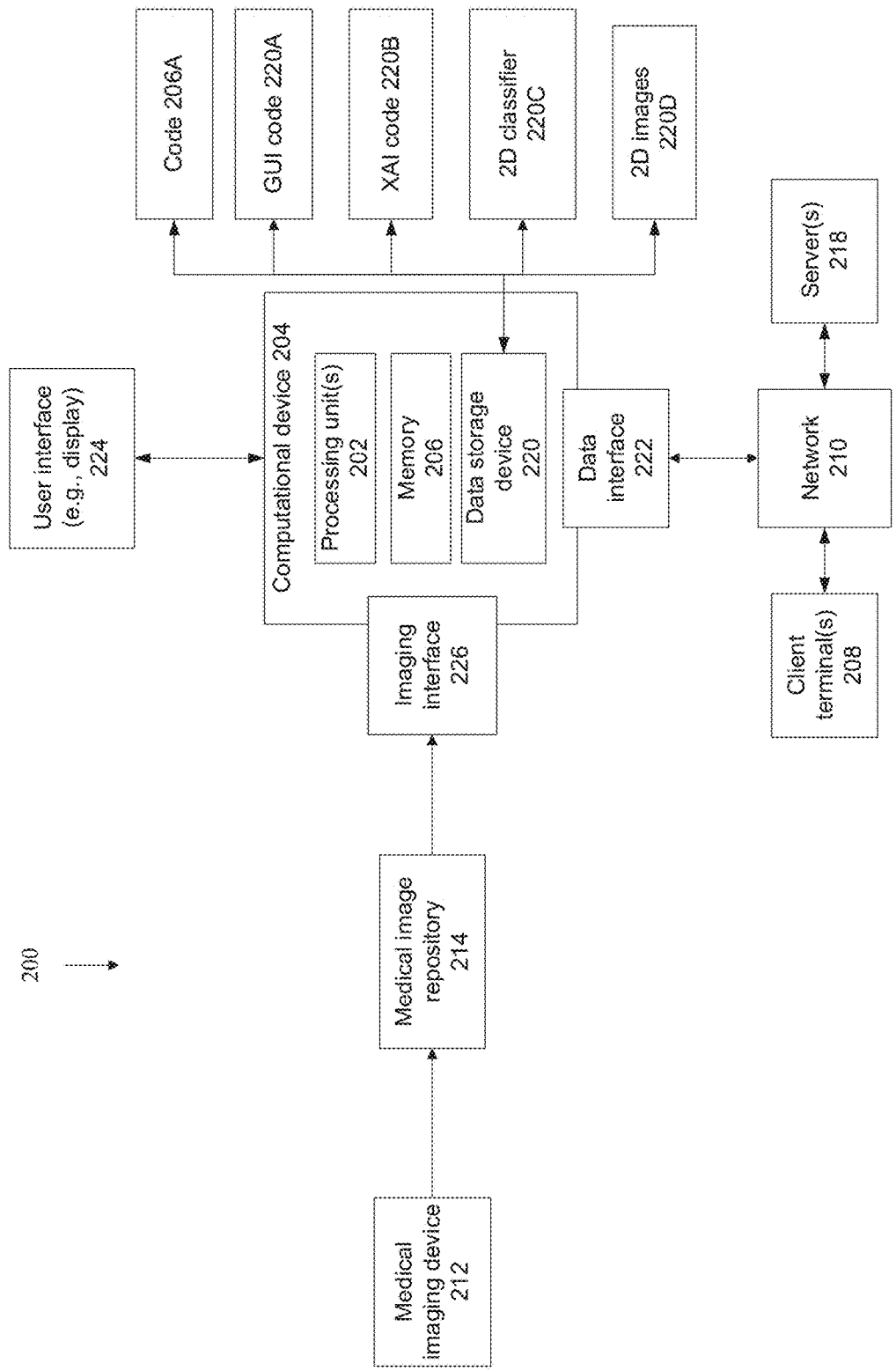
FIG. 2, which is a block diagram of components of a system for generating a composite 2D interpretation image from a 3D medical image and/or for training a 2D classifier using composite 2D interpretation images generated from a 3D medical image, in accordance with some embodiments of the present invention.
Figure 3:
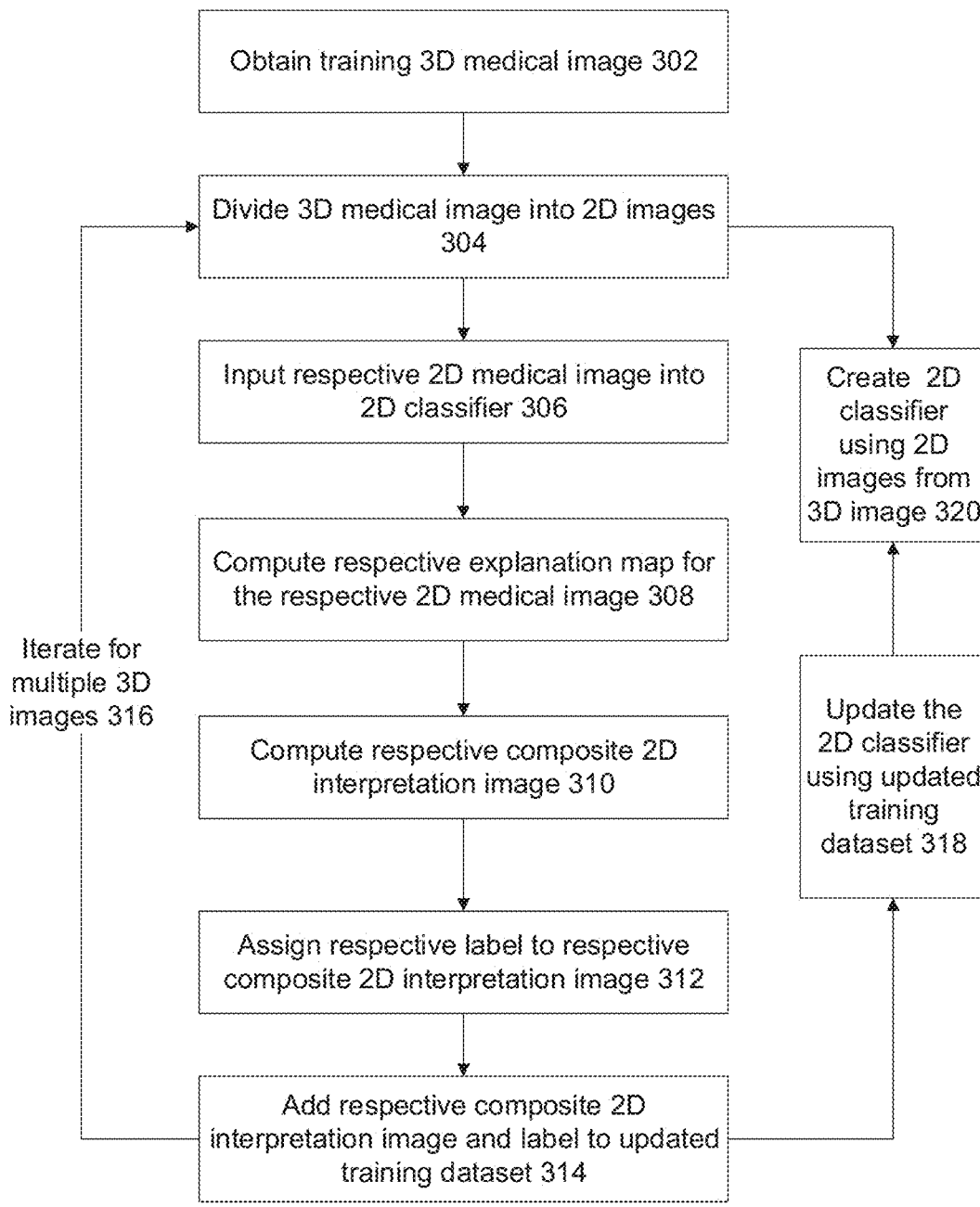
FIG. 3, which is a flowchart of a method for training a 2D classifier using composite 2D interpretation images generated from a 3D medical image, in accordance with some embodiments of the present invention.

Reference is now made to FIG. 1, which is a flowchart of a method of generating a composite 2D interpretation image from a 3D medical image, in accordance with some embodiments of the present invention. Reference is also made to FIG. 2, which is a block diagram of components of a system 200 for generating a composite 2D interpretation image from a 3D medical image and/or for training a 2D classifier using composite 2D interpretation images generated from a 3D medical image, in accordance with some embodiments of the present invention. Reference is also made to FIG. 3, which is a flowchart of a method for training a 2D classifier using composite 2D interpretation images generated from a 3D medical image, in accordance with some embodiments of the present invention. System 200 may implement the features of the method described with reference to FIG. 1 and/or FIG. 3, by one or more hardware processors 202 of a computing device 204 executing code instructions stored in a memory (also referred to as a program store) 206.

Computing device 204 may be implemented as, for example, a client terminal, a server, a radiology workstation, a virtual machine, a virtual server, a computing cloud, a mobile device, a desktop computer, a thin client, a Smartphone, a Tablet computer, a laptop computer, a wearable computer, glasses computer, and a watch computer.

Computing 204 may include an advanced visualization workstation that sometimes is add-on to a radiology workstation and/or other devices.

Computing device 204 and/or client terminals 208 and/or servers 218 may be implemented as, for example, radiology workstations, image viewing stations, picture archiving and communication system (PACS) server, and electronic medical record (EMR) server.

Multiple architectures of system 200 based on computing device 204 may be implemented. In an exemplary implementation, computing device 204 storing code 206A may be implemented as one or more servers (e.g., network server, web server, a computing cloud, a virtual server) that provides services (e.g., one or more of the acts described with reference to FIG. 1) to one or more servers 218 and/or client terminals 208 over a network 210, for example, providing software as a service (SaaS) to the servers 218 and/or client terminal(s) 208, providing software services accessible using a software interface (e.g., application programming interface (API), software development king (SDK)), providing an application for local download to the servers 218 and/or client terminal(s) 208, and/or providing functions using a remote access session to the servers 218 and/or client terminal(s) 208, such as through a web browser and/or viewing application. For example, users use client terminals 208 to access computing device 204 acting as a PACS server or other medical image storage server. Computing device 204 computes the composite image(s) from a 3D medical image provided by the client terminal 208 and/or obtained from another data source (e.g., PACS server). The composite image(s) may be provided to the client terminal 208 for presentation on a display of client terminal 208 (e.g., beside a presentation of the 3D medical image) and/or provided for further processing and/or stored. Alternatively or additionally, the composite image(s) is used to update the training of 2D classifier 220C, as described herein. The updated 2D classifier 220C may be used, for example, as described herein. Other features may be performed centrally by computing device 204 and/or locally at client terminal 208. In another implementation, computing device 204 may include locally stored software (e.g., code 206A) that performs one or more of the acts described with reference to FIG. 1 and/or FIG. 3, for example, as a self-contained client terminal and/or server. The composite image may be locally computed from 3D image and/or 2D frames, and the composite image may be presented on a display of computing device 204. In yet another implementation, server 218 is implemented as the medical image storage server. Users use client terminals 208 to access the composite image(s) from server 218. The composite image(s) may be locally computed by server 218 and/or by computing device 204, using the 3D image and/or 2D frames which may be stored on server 218 and/or at another location. The composite image is presented on the display of client terminals 208. Computing device 204 may provide enhanced features to the image server 218, by computing composite images from 3D images and/or 2D frames stored by the image server 218. For example, PACS server 218 communicates with computing device 204 using an API, to transfer the 3D image and/or composite image to computing device 204 and/or to receive the computed composite image(s).

Computing device 204 receives 3D medical images and/or 2D images (e.g., obtained as a video) captured by a medical imaging device(s) 212. The medical imaging device 212 may capture 3D images, for example, CT, MRI, breast tomography, 3D ultrasound, and/or nuclear images such as PET. Alternatively or additionally, the medical imaging device 212 may capture a video of 2D images, for example, colonoscope, bronchoscope, endoscope, and 2D ultrasound.

Medical images captured by medical imaging device 212 may be stored in an anatomical image repository 214, for example, a storage server, a computing cloud, a virtual memory, and a hard disk. The 2D images 220D which are created by dividing the 3D image, and/or the 2D slices and/or 2D frames captured as a video, as described herein, may be stored in medical image repository 214, and/or in other locations such as data storage device 220 of computing device 204, and/or on another server 218. The storage of 2D images 220D by data storage device 220 as depicted in FIG. 2 is one not necessarily limiting example.

Computing device 204 may receive the 3D image and/or 2D frames, and/or sequence(s) of 2D medical image(s) via one or more imaging interfaces 226, for example, a wire connection (e.g., physical port), a wireless connection (e.g., antenna), a network interface card, other physical interface implementations, and/or virtual interfaces (e.g., software interface, application programming interface (API), software development kit (SDK), virtual network connection).

Memory 206 stores code instructions executable by hardware processor(s) 202. Exemplary memories 206 include a random access memory (RAM), read-only memory (ROM), a storage device, non-volatile memory, magnetic media, semiconductor memory devices, hard drive, removable storage, and optical media (e.g., DVD, CD-ROM). For example, memory 206 may code 206A that execute one or more acts of the method described with reference to FIGS. 1 and/or 3.

Computing device 204 may include data storage device 220 for storing data, for example, GUI code 220A (which may present the composite images, such as beside the 3D image), XAI code 220B that computes the explanation maps, 2D classifier which receives the 2D images as input, and/or 2D images 220D obtained by dividing the 3D medical images and/or obtained as frames of a video, as described herein. Data storage device 220 may be implemented as, for example, a memory, a local hard-drive, a removable storage unit, an optical disk, a storage device, a virtual memory and/or as a remote server 218 and/or computing cloud (e.g., accessed over network 210). It is noted that GUI 220A and/or XAI code 220B and/or 2D classifier 220C and/or 2D images 220D may be stored in data storage device 220, for example, with executing portions loaded into memory 206 for execution by processor(s) 202.

Computing device 204 may include data interface 222, optionally a network interface, for connecting to network 210, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Computing device 204 may connect using network 210 (or another communication channel, such as through a direct link (e.g., cable, wireless) and/or indirect link (e.g., via an intermediary computing unit such as a server, and/or via a storage device) with one or more of:

Client terminal(s) 208, for example, users using client terminals 208 to access computing device 204 for viewing composite images computed based on the 3D image (and/or based on the sequence of 2D images) stored on the server (e.g., computing device 204 acts as the PACS server). The composite images may be computed by computing device 204 and/or by client terminal 208.

Server 218, for example, when server 218 is implemented as the PACS server, where users use client terminals 208 to access the PACS server. Computing device 204 provides enhanced features to the PACS server, receiving the 3D image and/or 2D video frames from the PACS server, and providing the composite image(s) to the PACS server, where client terminals access the composite image(s) from the PACS server.

Medical image repository 214 that stores captured 3D images and/or 2D video frames and/or the composite image(s). Medical image repository 214 may store the 2D images created by dividing the 3D image.

Computing device 204 and/or client terminal(s) 208 and/or server(s) 218 include and/or are in communication with one or more physical user interfaces 224 that include a display for presenting the composite image(s) and/or 3D image and/or video frames, and/or a mechanism for interacting with the composite image(s) and/or with the 3D image, such as rotating the viewing axis of the 3D image, zooming the composite image and/or the 3D image and/or marking finding on the composite image. Exemplary user interfaces 208 include, for example, one or more of, a touchscreen, a display, a keyboard, a mouse, and voice activated software using speakers and microphone.

Referring now back to FIG. 1, at 102, a 3D medical image is obtained. Alternatively, a sequence of 2D images is obtained. The sequence of 2D medical images may be captured as a video over a time interval. The 2D medical images may be temporally spaced apart, for example, a 2D frame per second, or other values. The sequence of 2D images may be obtained at different locations along a region of the body, effectively depicting a 3D volume within the body, for example, along the colon, along the esophagus, along the trachea, and/or different 2D slices along the body (e.g., 2D ultrasound slices of the liver).

Examples of 3D medical images include: CT, MRI, breast tomography, digital breast tomosynthesis (DBT), 3D ultrasound, 3D nuclear imaging, and PET.

Examples of 2D medical images include: colonoscope, endoscope, bronchoscope, and 2D ultrasound.

At 104, the 3D medical images may be divided into 2D images, optionally 2D slices. The 2D slices may be parallel to each other, and sliced along a common slicing plane. The 3D medical images may be automatically divided (e.g., by a PACS server, by a CT machine, by DICOM based code, by viewing software) into 2D slices along a predefined axis. Alternatively, the slicing axis is selected by a user and/or automatically selected by code, for example, as described herein.

The sequence of 2D images is already considered as being divided. Optionally, to obtain another slicing axis, a 3D image may be reconstructed from the sequence of 2D images, and the 3D reconstructed image is then sliced along a selected axis.

At 106, a respective 2D medical image is inputted into a 2D classifier.

Optionally, the 2D classifier has been previously trained on a training dataset of 2D medical images labelled with an indication of a visual finding depicted therein.

Optionally, the indication of the visual finding of the training dataset is non-localized. The training 2D medical images may be associated with labels indicating the presence or absence of the visual finding in the respective training 2D medical image as a whole, without indicating where the visual finding is located in an image. The 2D classifier generates an outcome indicative of the visual finding for an input 2D image as a whole, with non-localization data, for example, outputting a YES/NO value indicating presence or absence of the visual finding for the image as a whole.

Optionally, the visual finding is an indication of cancer, for example, breast cancer, lung nodule, colon cancer, brain cancer, bladder cancer, kidney cancer and metastatic disease. Alternatively, other visual findings may be defined. The cancer may be treated by applying a treatment suitable for treatment of cancer, optionally for the type of cancer, for example, surgery, chemotherapy, radiation therapy, immunotherapy, and combinations of the aforementioned.

At 108, a respective explanation map is computed for the respective 2D medical image. The explanation map includes multiple regions corresponding to regions of the respective 2D image, for example, each respective pixel of the explanation map corresponds to each respective pixel of the 2D image, a group of respective pixels (e.g., 2×2, 3×3, or other regions) of the explanation map corresponds to a single pixel of the 2D image, a single respective pixel of the explanation map corresponds to a group of pixels of the 2D image, and/or a group of respective pixels of the explanation map corresponds to a group of pixel of the 2D image. Each respective region of the respective explanation map is associated with a computed explainable weight. The explainable weight is indicative of an influence of the respective corresponding region of the respective 2D medical image on the outcome of the 2D classifier fed the respective 2D medical image. Each explanation weight of each respective explanation map may denote a relative influence of the respective corresponding region on the outcome of the 2D classifier, for example, a first pixel has a weight of 50, and a second pixel has a weight of 10, indicating that the first pixel is 5× more significant than the second pixel in the 2D classifier's decision of a visual finding. Optionally, a sum of the explainable weights of the plurality of regions of each respective explanation map may sum to 100% (or 1), or the sum of the weights is not necessarily a fixed value.

The explanation map may be implemented as a heat map.

The explanation map may be computed using XAI code that computes weights of regions (e.g., per pixel, or per group of pixels) that most influence the 2D classifier's decision, optionally generating the heat map. Exemplary XAI code are described, for example, with reference to R. C. Fong and A. Vedaldi. *Interpretable explanations of black boxes by meaningful perturbation.* arXiv preprint arXiv: 1704.03296, 2017, and/or Shoshan, Y. and Ratner, V., 2018. *Regularized adversarial examples for model interpretability.* arXiv preprintarXiv: 1811.07311.

The explanation map may include pixels having pixel intensity values corresponding to pixels of the respective 2D medical image adjusted by the corresponding respective explainable weight. For example, for a certain pixel of the 2D image may have a pixel intensity value of 75, the corresponding explainable weight is computed as 0.6, obtaining a pixel intensity value of 45 for the explanation map.

In terms of mathematical representation, the 3D image may be denoted V, the explanation map (e.g., heatmap) may be denoted H, where voxels of the 3D image are denoted V(x,y,z), and the corresponding explainable weights are denoted H(x,y,z) that indicate impact on the decision of the 2D classifier when fed slice number denoted z of volume V.

At 110, features described with reference to 106-108 may be iterated, sequentially and/or in parallel, for the 2D medical images. Optionally, 106-108 are iterated for each of the 2D medical images. Alternatively, a subset of the 2D medical images is selected, for example, by uniform sampling. The sampled subset of 2D medical images may be processed as described with reference to 106-108.

At 112, a subset of the explanation maps may be selected for creation of the composite 2D image. The explanation maps may be selected according to inclusion of one or more clusters of one or more regions of explanation weights that meets a requirement, for example, the cluster has a higher total explanation weight value and/or higher average explanation weight value by a threshold and/or range than explanation weights of other regions excluded from the cluster. For example, the weights of pixels in the cluster are at least higher than 0.5 than pixels not included in the cluster. In another example, the cluster of explanation weights above a threshold has at least a minimal dimension. For example, a cluster is defined as a group of pixels having explanation weights greater than 0.6 and/or having a dimension of at least 5×5 pixels, or 10×10 pixels, and/or an average explanation weight greater than 0.7, or other values.

At 114, a composite 2D interpretation image is computed from the multiple explanation maps. The composite 2D interpretation image includes a respective aggregation weight for each respective region thereof, for example per pixel or per group of pixels (e.g., 2×2, 3×3, or other dimensions). Each respective aggregation weight may denote a respective likelihood of presence of the visual finding at the corresponding respective region of the computed composite 2D interpretation image.

The composite 2D interpretation image may be a projection of the 3D image to a 2D image, via the weights of the explanation maps.

Each respective aggregation weight is computed by aggregating the explainable weights computed for the respective regions of the explanation maps corresponding to the respective region of the composite 2D interpretation image. Optionally, each of the 2D medical images includes pixels corresponding to voxels of the 3D medical image. Each respective explainable weight is assigned to each pixel of each of the 2D medical images. The respective aggregation weight may be computed for each pixel of the composite 2D interpretation image having a certain (x,y) coordinate by aggregating the explainable weights of pixels of the 2D medical images having corresponding (x,y) coordinates for varying z coordinates. For example, for 2D medical images obtained by dividing the 3D medical image along a z-axis into 2D slices, the respective aggregation weight is computed for each respective region (e.g., pixel or groups of pixels) of the 2D slices having common x,y coordinates along an x-axis and a y-axis and varying z coordinates along the z-axis which may indicate the slice number. For example, the explainable weights at (x,y,z) coordinates (10,15,1), (10,15,2), (10,15,3), (10,15,4), and (10,15,5) of 5 explanation maps are aggregated into a single aggregation weight and assigned to the pixel at (x,y) coordinates (10,15) of the composite 2D image. The aggregation weight at coordinate (10,15) of the composite 2D image corresponds to voxels at (x,y,z) coordinates (10,15,z) of the 3D image, where z is variable across the range of z values of the 3D image.

Each respective aggregation weight of the composite 2D interpretation image may computed, for example, as a weighted mean, as an average, medial, sum, maximal value, or mode, of the explainable weights computed for the respective regions of the explanation maps corresponding to the respective region of the composite 2D interpretation image.

Optionally, when the explanation map includes pixels having pixel intensity values corresponding to pixels of the respective 2D medical image adjusted by the corresponding respective explainable weight, the composite 2D interpretation image includes pixels having pixel intensity values computed by aggregating the pixel intensity values adjusted by the corresponding respective explainable weight of the explanation maps.

In terms of mathematical notation, the 2D composite image is denoted C, where every pixel denoted (x,y) is an aggregation of slices (e.g., all slices) denoted V(z,y,:), weighted by respective explanation map (e.g., heatmap) weights denoted (H(x,y,:):, where the following example equation holds:

$$C(x,y) = \text{sum\_over\_}z(H(x,y,z) * V(x,y,z)) / \text{sum\_over\_}z(H(x,y,z))$$

At 116, optionally, an optimal viewing angle for the composite 2D image is computed. The 3D image may be presented at the determined optimal viewing angle. The optimal viewing angle represents a minimal occlusion of the visual finding within the 3D image.

The optimal viewing angle may represent the optimal angle for projection of the 3D image to the composite 2D image via the weights of the explanation maps.

The optimal viewing angle may correspond to the slicing angle used to create the 2D slices from the 3D image, i.e., a certain orientation of the z-axis defining an axis of slicing of the 3D medical image into the 2D slices. The 2D slices sliced at the optimal viewing angle are used to generate an optimal composite 2D interpretation image with maximal aggregation weights denoting minimal occlusion of the visual finding. The optimal viewing angle may be selected, for example, by sequential and/or parallel trial and error, by evaluating multiple composite 2D images computed for different optimal viewing angles (e.g., selected randomly, and/or sequentially starting at a predefined value), where the optimal viewing angle is selected according to the optimal composite 2D image with minimal occlusion of the visual finding within the 3D image when the 3D image is presented at the optimal viewing angle. Alternatively or additionally, the optimal viewing angle may be compute, for example, based on code that analyzes the 3D image and/or the composite 2D image to select the optimal orientation.

It is noted that the optimal viewing angle may be determined at one or more feature of the process for computing and/or presenting the composite 2D image, for example, prior to the initial division of the 3D image into 2D images (e.g., as described with reference to 104), and/or by iterating 104-114 in a trial and error process, and/or in other suitable parts of the process.

At 118, the 2D composite image is provided, for example, presented on a display, stored on a memory and/or in a data storage device (e.g., PACS server), forwarded to another device (e.g., from the PACS server to a client terminal for viewing thereon), and/or provided to another process, for example, fed into another classifier, fed into the 2D classifier, and/or used to update the training of the 2D classifier.

Optionally, the 2D composite image is presented simultaneously with the 3D image, for example, side by side. The 2D composite image may replace a standard summary image crated for the 3D image, for example, using CVIEW.

Optionally, when the optimal 2D composite image is computed according to the determined optimal angle of the viewing axis, the presentation of the 3D medical image on the display may be automatically adjusted to an orientation (e.g., of the z-axis) corresponding to the optimal viewing angle.

At 120, one or more features described with reference to 104-118 are iterated, optionally for dynamically updating the 2D composite image to correspond to a real time viewing axis of the 3D image, for example, according to real time user navigation.

The user may adjust the angle of the viewing axis of the 3D image presented on the display. The real time value of the viewing axis of the 3D image may be tracked. The orientation of the z-axis defining the axis of slicing of the 3D medical image into the 2D slices (e.g., as described with reference to 104) may be set according to the real time value of the viewing axis selected by the user viewing the 3D medical image presented on the display. A current composite 2D interpretation image is computed based on the z-axis corresponding to the value of the viewing axis (e.g., as described with reference to 106-114). The current composite 2D is presented on the display alongside the 3D medical image (e.g., as described with reference to 118). A change in the value of the viewing axis of the 3D medical image presented on the display is dynamically detected (e.g., as described with reference to 120). An updated composite 2D interpretation image is dynamically computed based on the change in the value of the viewing axis (e.g., as described with reference to 106-114). The display is dynamically updated by presenting the updated composite 2D interpretation image (e.g., as described with reference to 118).

Referring now back to FIG. 3, at 302, training 3D medical images of multiple sample subjects are accessed. The training 3D medical images are optionally all of a same type of imaging modality, depicting a same body location, for finding a same type of visual finding, for example, all chest CT scans for locating pulmonary nodules, and/or all 3D mammograms for locating breast cancer.

At 304, a respective 3D medical image is divided into multiple 2D medical images, for example, as described with reference to 104 of FIG. 1.

At 306, the respective 2D medical images (e.g., each one) are inputted into a 2D classifier trained on a training dataset of 2D medical images labelled with an indication of a visual finding depicted therein, for example, as described with reference to 106 of FIG. 1.

At 308, a respective explanation map for the respective 2D medical image is computed. The respective explanation map includes regions corresponding to regions of the respective 2D image. Each respective region of the respective explanation map is associated with a computed explainable weight indicative of an influence of the respective corresponding region of the respective 2D medical image on the outcome of the 2D classifier fed the respective 2D medical image. For example, as described with reference to 108 of FIG. 1.

At 310, a respective composite 2D interpretation image is computed. The composite 2D interpretation image includes a respective aggregation weight for each respective region thereof. Each respective aggregation weight is computed by aggregating the explainable weights computed for the respective regions of the explanation maps corresponding to the respective region of the composite 2D interpretation image. For example, as described with reference to 110 of FIG. 1.

At 312, a respective label is assigned to the composite 2D interpretation image indicative of presence of the visual finding depicted therein. The label may be created, for example, manually by a user based on manual visual inspection of the 3D image and/or the composite 3D interpretation image, and/or automatically, for example, by natural language processing (NLP) code that analyzes a radiology report created for the 3D image to extract the visual finding.

At 314, the composite respective 2D interpretation image and corresponding label may be added to an updated training dataset.

At 316, one or more features described with reference to 304-314 are iterated for the multiple 3D training medical images, optionally for each 3D medical image.

At 318, an updated 2D classifier may be created by updating the training of the 2D classifier using the updated training dataset. The updated 2D classifier may be used for creation of new composite 2D images, for example, used in the process described with reference to 106 of FIG. 1, and/or in 306 of FIG. 3.

Optionally, at 320, after accessing the training 3D medical images as in 302, and after the 3D image(s) are divided as in 304, the 2D classifier may be created and/or updated. Each respective 2D medical image may be associated with a label indicative of presence of a visual finding depicted with the respective 2D medical image (e.g., created manually and/or automatically, as described herein). The label may be non-localized, i.e., assigned to the respective 2D medical image as a whole. The training dataset of 2D medical images may be created by including the 2D medical images and associated label that is non-localized created from the 3D medical images. The 2D classifier may be created and/or updated using the training dataset.

Reference is now made to FIG. 4, is a schematic depicting respective composite 2D interpretation images 400A, 400B, and 400C, in comparison to other standard approaches for computing a 2D image from a 3D image, in accordance with some embodiments of the present invention.

Composite 2D interpretation images 400A, 400B, and 400C are computed for 2D images sliced along a z-axis of the 3D image, for a certain fixed y-value of the y-axis, for a set of x-values along the x-axis, for example, a horizontal line of pixels. Composite 2D interpretation images 400A, 400B, and 400C represent a horizontal line of pixels, also referred to as composite interpretation lines. The horizontal line of pixels is depicted for clarity and simplicity of explanation. It is to be understood that a full composite 2D interpretation image includes multiple parallel horizontal pixel lines along the y-axis.

Each of composite 2D interpretation images 400A, 400B, and 400C is based on a common 3D signal denoted $F(x,y,z)$, for which 3D image 402 is shown, i.e., a single horizontal line of pixels at a same y-value of each 2D slice is depicted. Within 3D image 402, first circle 404 and second circle 406 denote clinically significant visual findings, while rectangle 408 and oval 410 denote non-significant anatomical features and/or artifacts.

Composite interpretation line 400A is computed using a standard approach, by computing a sum of the lines of 3D image 402, denoted as $P(x,y)=\Sigma_{z=0}^{n} F(x,y,z)$. It is noted that first circle 404 is partially obstructed by rectangle 408, and second circle 406 is fully obstructed by rectangle 408, making it difficult to discern the presence first circle 404 and second circle 406 within composite interpretation line 400A.

Composite interpretation line 400B is computed using a state of the art (SOTA) approach, where a heatmap indicative of location of the visual finding is generated by a 2D classifier for each 2D image of 3D image 402. The 2D classifier is trained on a training dataset of 2D images with labels assigned to locations of visual findings within the training images. The heatmap output of the 2D classifier in response to each 2D slice is denoted as $D_z(x,y)$. Composite interpretation line 400B is computed using the equation $P(x,y)=\Sigma_{z=0}^{n}D_z(x,y)F(x,y,z)$. It is noted that although first circle 404 is partially obstructed by rectangle 408, and second circle 406 is fully obstructed by rectangle 408, the presence first circle 404 and second circle 406 are discernable within composite interpretation line 400B, since the higher heatmap is higher at locations corresponding to first circle 404 and second circle 406 and lower at locations corresponding to rectangle 408 and oval 410.

Composite interpretation line 400C is computed using as described herein, using a 2D classifier that generates a non-localized outcome, where the 2D classifier is trained on a training dataset with non-localized labels, and the composite interpretation image is computed by aggregating explanation weights of explanation maps. The explanation map computed for each 2D slice is denoted as $D_z(x,y)$. Composite interpretation line 400C is computed using the equation $P(x,y)=\Sigma_{z=0}^{n}H_z(x,y)F(x,y,z)$. It is noted that the presence first circle 404 and second circle 406 are discernable within composite interpretation line 400C at least as well as for composite interpretation line 400B computed using the state of the art approach, with the added advantage that the 2D classifier is training using non-localized labels, which provides for automated training of the 2D classifier using labels automatically extracted from radiology reports such as using NLP approaches.

Reference is now made to FIG. 5, which is schematic depicting automated computation of a certain orientation of a z-axis defining an axis of slicing of the 3D medical image into the 2D slices for generating an optimal composite 2D interpretation image with maximal aggregation weights denoting maximal likelihood of presence of the visual finding, in accordance with some embodiments of the present invention. The presentation of the 3D medical image on the display may be adjusted according to the certain orientation of the z-axis, and/or the optimal composite 2D interpretation image computed based on the certain orientation of the x-axis may be presented on the display.

Schematic 502 is for the case of a standard z-axis 504. A composite 2D interpretation image 506 is computed for 2D images sliced along z-axis 504 of a 3D image 508. For clarity and simplicity of explanation, the composite 2D interpretation image 506 represents a horizontal line of pixels, also referred to as composite interpretation lines, computed from 2D images sliced along z-axis 504 of the 3D image, for a certain fixed y-value of the y-axis, for a set of x-values along the x-axis, for example, a horizontal line of pixels. It is to be understood that a full composite 2D interpretation image includes multiple parallel horizontal pixel lines along the y-axis.

Within 3D image 508, circle 510 denote clinically significant visual findings, while rectangle 512 and oval 514 denote non-significant anatomical features and/or artifacts.

For composite 2D interpretation image 506 created using the standard z-axis 504, circle 510 and rectangle 512 are along a same line parallel to standard z-axis 512. As a result, weights of circle 510 are aggregated with weights of rectangle 512, which may make discerning circle 510 more difficult. In cases where rectangle 512 denotes clinically significant visual findings, the combination of weights of circle 510 with weights of rectangle 512 may make it more difficult to differentiate that there are two spatially spaced visual findings in 3D image 508.

In contrast, schematic 516 is for the case of a selected z-axis 518 for generating an optimal composite 2D interpretation image 520 with maximal aggregation weights denoting maximal likelihood of presence of the visual finding. For composite 2D interpretation image 520 created using selected z-axis 518, each of circle 510, rectangle 512, and oval 514 are along different lines parallel to selected z-axis 518. As a result, weight of circle 510 are not aggregated with weights of rectangle 512, and not aggregated with weights of oval 514, which make it possible to better differentiate between the weights of the different visual findings on optimal composite 2D interpretation image 520.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant classifiers and/or XIA processes will be developed and the scope of the term classifiers and/or XIA processes are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of generating a composite 2D interpretation image from a 3D medical image, comprising:
   inputting each of a plurality of 2D medical images obtained by at least one of: dividing a 3D medical image and captured as a video over a time interval, into a 2D classifier trained on a training dataset of 2D medical images labelled with an indication of a visual finding depicted therein;
   computing a respective explanation map of a plurality of explanation maps for each respective 2D medical image of the plurality of 2D medical images, the respective explanation map including a plurality of regions corresponding to a plurality of corresponding regions of the respective 2D image, each respective region of the respective explanation map is associated with a computed explainable weight indicative of an influence of the respective corresponding region of the respective 2D medical image on the outcome of the 2D classifier fed the respective 2D medical image;
   computing a composite 2D interpretation image comprising a respective aggregation weight for each respective region thereof, each respective aggregation weight computed by aggregating a plurality of the explainable weights computed for the respective regions of the plurality of explanation maps corresponding to the respective region of the composite 2D interpretation image; and
   providing the composite 2D interpretation image for presentation on a display.

2. The method of claim 1, wherein each respective aggregation weight denoting respective likelihood of presence of the visual finding at the corresponding respective region of the computed composite 2D interpretation image.

3. The method of claim 1, wherein the plurality of 2D medical images are computed by dividing the 3D medical image along a z-axis into a plurality of sequential 2D slices, wherein the respective aggregation weight is computed for each respective region of the plurality of sequential 2D slices having common x,y coordinates along an x-axis and a y-axis and varying z coordinates along the z-axis.

4. The method of claim 3, wherein the orientation of the z-axis defining an axis of slicing of the 3D medical image into the plurality of sequential 2D slices is obtained according to a viewing axis selected by a user viewing the 3D medical image presented on a display, wherein the composite 2D interpretation image computed based on the z-axis corresponding to the viewing axis is presented on the display, alongside the 3D medical image, and further comprising, in at least one iteration:
   dynamically detecting a change in the viewing axis of the 3D medical image presented on the display;
   dynamically computed an updated composite 2D interpretation image based on the change in the viewing axis; and
   dynamically updating the display for presenting the updated composite 2D interpretation image.

5. The method of claim 3, further comprising:
   computing a certain orientation of the z-axis defining an axis of slicing of the 3D medical image into the plurality of sequential 2D slices that generates an optimal composite 2D interpretation image with maximal aggregation weights denoting minimal occlusion of the visual finding;
   automatically adjusting the presentation of the 3D medical image on the display to the certain orientation of the z-axis; and
   presenting the optimal composite 2D interpretation image on the display.

6. The method of claim 3, wherein each of the plurality of 2D medical images includes pixels corresponding to voxels of the 3D medical image, a respective explainable weight is assigned to each pixel of each of the plurality of 2D medical images, and the respective aggregation weight is computed for each pixel of the composite 2D interpretation image having a certain (x,y) coordinate by aggregating the explainable weights of pixels of the plurality of 2D medical images having corresponding (x,y) coordinates for varying z coordinates.

7. The method of claim 1, wherein the indication of the visual finding of the training dataset is non-localized, for the respective 2D image as a whole, and wherein the 2D classifier generates an outcome indicative of the visual finding for an input 2D image as a whole, with non-localization data.

8. The method of claim 1, wherein each explanation weight of each respective explanation map denotes a relative influence of the respective corresponding region on the outcome of the 2D classifier.

9. The method of claim 1, wherein each respective aggregation weight of the composite 2D interpretation image is computed as a weighted mean of the explainable weights computed for the respective regions of the plurality of explanation maps corresponding to the respective region of the composite 2D interpretation image.

10. The method of claim 1, wherein each respective explanation map comprises a plurality of pixels having pixel intensity values corresponding to pixels of the respective 2D medical image adjusted by the corresponding respective explainable weight, wherein the composite 2D interpretation image comprises a plurality of pixels having pixel intensity values computed by aggregating the pixel intensity values adjusted by the corresponding respective explainable weight of the plurality of explanation maps.

11. The method of claim 1, wherein the 3D medical image is selected from the group consisting of: CT, MRI, breast tomography, digital breast tomosynthesis (DBT), 3D ultrasound, 3D nuclear imaging, and PET.

12. The method of claim 1, wherein the visual finding denotes cancer.

13. The method of claim 1, further comprising selecting a subset of the plurality of explanation maps, wherein each selected explanation map includes at least one cluster of at least one region with explanation weights that is higher by a requirement than explanation weights of other regions excluded from the cluster, wherein the composite 2D image is computed from the selected subset.

14. The method of claim 1, further comprising generating an updated 2D classifier of the 2D classifier for analysis of 2D images of the 3D medical image, by:
  accessing a plurality of training 3D medical images;
  for each respective 3D medical image of the plurality of 3D medical images:
    dividing the respective 3D medical image into a plurality of 2D medical images;
    inputting each of the plurality of 2D medical images into a 2D classifier trained on a training dataset of 2D medical images labelled with an indication of a visual finding depicted therein;
    computing a respective explanation map of a plurality of explanation maps for each respective 2D medical image of the plurality of 2D medical images, the respective explanation map including a plurality of regions corresponding to a plurality of corresponding regions of the respective 2D image, each respective region of the respective explanation map is associated with a computed explainable weight indicative of an influence of the respective corresponding region of the respective 2D medical image on the outcome of the 2D classifier fed the respective 2D medical image;
    computing a composite 2D interpretation image comprising a respective aggregation weight for each respective region thereof, each respective aggregation weight computed by aggregating a plurality of the explainable weights computed for the respective regions of the plurality of explanation maps corresponding to the respective region of the composite 2D interpretation image;
    assigning a label to the composite 2D interpretation image indicative of presence of the visual finding depicted therein;
  generating an updated training dataset including a plurality of the composite 2D interpretation images and corresponding labels; and
  generating the updated 2D classifier by updating the training of the 2D classifier using the updated training dataset.

15. The method of claim 14, further comprising, after accessing the plurality of training 3D medical images:
  dividing each of the plurality of 3D medical images into a plurality of 2D medical images;
  labelling each respective 2D medical image with a label indicative of presence of a visual finding depicted with the respective 2D medical image, wherein the label is non-localized and assigned to the respective 2D medical image as a whole;
  creating the training dataset of 2D medical images that include the plurality of 2D medical images and associated label that is non-localized; and
  training the 2D classifier using the training dataset.

16. The method of claim 1, wherein the plurality of 2D medical images captured as video are captured by an imaging device selected from the group consisting of: colonoscope, endoscope, bronchoscope, and 2D ultrasound.

17. A device for generating a composite 2D interpretation image from a 3D medical image, comprising:
  at least one hardware processor executing a code for:
    inputting each of a plurality of 2D medical images obtained by at least one of: dividing a 3D medical image and captured as a video over a time interval, into a 2D classifier trained on a training dataset of 2D medical images labelled with an indication of a visual finding depicted therein;
    computing a respective explanation map of a plurality of explanation maps for each respective 2D medical image of the plurality of 2D medical images, the respective explanation map including a plurality of regions corresponding to a plurality of corresponding regions of the respective 2D image, each respective region of the respective explanation map is associated with a computed explainable weight indicative of an influence of the respective corresponding region of the respective 2D medical image on the outcome of the 2D classifier fed the respective 2D medical image;
    computing a composite 2D interpretation image comprising a respective aggregation weight for each respective region thereof, each respective aggregation weight computed by aggregating a plurality of the explainable weights computed for the respective regions of the plurality of explanation maps corresponding to the respective region of the composite 2D interpretation image; and
    providing the composite 2D interpretation image for presentation on a display.

18. A computer program product for generating a composite 2D interpretation image from a 3D medical image, comprising a non-transitory medium storing a computer program which, when executed by at least one hardware processor, cause the at least one hardware processor to perform:
  inputting each of a plurality of 2D medical images obtained by at least one of: dividing a 3D medical image and captured as a video over a time interval, into a 2D classifier trained on a training dataset of 2D medical images labelled with an indication of a visual finding depicted therein;

computing a respective explanation map of a plurality of explanation maps for each respective 2D medical image of the plurality of 2D medical images, the respective explanation map including a plurality of regions corresponding to a plurality of corresponding regions of the respective 2D image, each respective region of the respective explanation map is associated with a computed explainable weight indicative of an influence of the respective corresponding region of the respective 2D medical image on the outcome of the 2D classifier fed the respective 2D medical image;

computing a composite 2D interpretation image comprising a respective aggregation weight for each respective region thereof, each respective aggregation weight computed by aggregating a plurality of the explainable weights computed for the respective regions of the plurality of explanation maps corresponding to the respective region of the composite 2D interpretation image; and providing the composite 2D interpretation image for presentation on a display.

* * * * *